United States Patent [19]

Morita et al.

[11] Patent Number: 4,694,049
[45] Date of Patent: Sep. 15, 1987

[54] THERMOPLASTIC ELASTOMER COMPOSITION

[75] Inventors: Ichiro Morita; Tadao Taika; Hidehiro Nakamura, all of Otsu, Japan

[73] Assignee: Toyo Boseki Kabushiki Kaisha T/A Toyobo Co., Ltd., Osaka, Japan

[21] Appl. No.: 795,289

[22] Filed: Nov. 5, 1985

[30] Foreign Application Priority Data

Nov. 6, 1984 [JP] Japan ................................ 59-233694

[51] Int. Cl.$^4$ ...................... C08L 67/02; C08L 67/04
[52] U.S. Cl. .................................... 525/440; 525/411
[58] Field of Search ................................ 525/440, 411

[56] References Cited

U.S. PATENT DOCUMENTS

| T908,011 | 3/1973 | Witsiepe | 525/440 |
| 4,071,503 | 1/1978 | Thomas | 525/440 |
| 4,081,422 | 3/1978 | Cordes | 525/440 |
| 4,088,665 | 5/1978 | Findeisen | 525/440 |
| 4,186,257 | 1/1980 | Blahak | 521/159 |
| 4,483,970 | 11/1984 | Huntjens | 525/440 |

Primary Examiner—Patricia A. Short

[57] ABSTRACT

Thermoplastic elastomer composition comprising 100 parts by weight of a polyester block copolymer and 0.05 to 20 parts by weight of a liquid diphenylmethane diisocyanate, which has a stable high melt viscosity with less variation of viscosity in the production lots and has also excellent flexural fatigue resistance and water resistance and is useful for the production of hollow shaped products such as bellows and section profiles such as moldings by blow molding or extrusion molding.

7 Claims, No Drawings

THERMOPLASTIC ELASTOMER COMPOSITION

The present invention relates to a novel thermoplastic elastomer composition, more particularly to a thermoplastic elastomer composition comprising a polyester block copolymer and a liquid diphenylmethane diisocyanate, which has a high melt viscosity and is suitable for producing hollow shaped products such as bellows or section profiles such as moldings by blow molding or extrusion molding.

PRIOR ART

It is known that thermoplastic elastomers having a high melt viscosity can be prepared by incorporating a polyester polyether block copolymer with a metal salt of a fatty acid, such as a dimeric acid salt or Surlyn A (a metal salt of ethylene-acrylic acid copolymer, manufactured by Du Pont), or by modifying a polyester polyether block copolymer with a polyisocyanate compound. The modification of a polyester polyether block copolymer with a polyisocyanate compound is disclosed, for example, in U.S. Defensive Patent Publication No. T-908011, Japanese Patent First Publication Nos. 121699/1977 and 78413/1982.

It has, however, been found that the reaction of a polyester polyether block copolymer with an isocyanate group in the polyisocyanate compound proceeds comparatively slowly even by mixing in molten state, and hence, the modification is completed only a certain period of time after meltextrusion, and hence, when the modification is carried out by using a conventional solid type diphenylmethane diisocyanate (abbreviated as "MDI"), it is difficult to uniformly mix it with the polyester block copolymer and to control the reaction. That is, it has been found that because of maldistribution of the solid MDI, it reacts only partially with the polyester elastomer, and hence, the products show various melt viscosity in each production lot and the shaped articles obtained therefrom have occasionally fish eye characteristics.

BRIEF DESCRIPTION OF THE INVENTION

The present inventors have intensively studied on uniform melt-mixing of a polyester block copolymer and a polyisocyanate compound in order to control easily the reaction and to obtain the desired compound having a high melt viscosity, and have unexpectedly found that when a liquid MDI is used as the polyisocyanate compound, it can easily uniformly be mixed with polyester block copolymers to give the desired thermoplastic elastomer composition having a high melt viscosity.

An object of the invention is to provide a novel thermoplastic elastomer composition having a high melt viscosity which is useful for the production of hollow shaped products and section profiles. Another object of the invention is to provide a thermoplastic elastomer composition which has less variation in the production lots. These and other objects and advantages of the invention will be apparent to the skilled persons in this field from the following description.

DETAILED DESCRIPTION OF THE INVENTION

The thermoplastic elastomer composition of the invention comprises 100 parts by weight of a polyester block copolymer and 0.05 to 20 parts by weight of a liquid diphenylmethane diisocyanate (MDI). According to the present invention, the polyester block copolymer and the liquid MDI can uniformly be mixed to give a composition having a high melt viscosity with less variation of the qualities in the production lots, and further, the product has advantageously an improved water resistance.

The polyester block copolymer used in the present invention is a thermoplastic polyester block copolymer comprising a polyester segment having a high melting point and a polymer segment having a low melting point and having a molecular weight of 400 to 6,000 wherein a polymer produced from the polyester segment having a high melting point alone has a melting point of not lower than 150° C. and the polymer segment having a low melting point alone has a melting or softening point of not higher than 80° C. The polymer segment having a low melting point is contained in the ratio of 5 to 80 % by weight, preferably 20 to 80 % by weight, based on the whole weight of the polyester block copolymer.

The polyester composing the polyester segment having a high melting point includes polyesters obtained from an aromatic dicarboxylic acid (e.g. terephthalic acid, isophthalic acid, 1,5-dinaphthalenedicarboxylic acid, 2,6-naphthalenedicarboxylic acid, 2,7-naphthalenedicarboxylic acid, bibenzoic acid, bis(p-carboxyphenyl)methane, 4,4'-sulfonyldibenzoic acid, etc.) and a diol having a low molecular weight (e.g. ethylene glycol, propylene glycol, 1,4-butanediol, 1,5-pentamethylene glycol, 2,2-dimethyltrimethylene glycol, 1,6-hexamethylene glycol, decamethylene glycol, p-xylylene glycol, cyclohexanedimethanol, etc.); copolyesters obtained from two or more kinds of the above aromatic dicarboxylic acids and two or more kinds of the above diols; polyesters derived from an oxyacid such as p-($\beta$-hydroxyethoxy)benzoic acid, p-hydroxybenzoic acid; polylactones (e.g. polypivalolactone, etc.); polyetheresters obtained from an aromatic ether dicarboxylic acid (e.g. 1,2-bis(4,4'-dicarboxymethylphenoxy)ethane, di-(4'-carboxyphenoxy)ethane, etc.) and the above-mentioned diol; and copolyesters obtained from a combination of the above-mentioned dicarboxylic acids, oxyacids and diols having a low molecular weight. The polyesters have a melting point of not lower than 15° C., preferably 150° to 230° C.

The polymer segment having a low melting point and having a molecular weight of 400 to 6,000 is contained in substantially amorphous state in the polyester block copolymer. The polymer segment alone show a melting or softening point of not higher than 80° C., preferably less than 40° C. Suitable examples of the polymer segment having a low melting point are polyether glycols (e.g. polyoxyethylene glycol, polyoxypropylene glycol, polyoxytetramethylene glycol, etc.) and a mixture thereof, and polyether glycol copolymers obtained by copolymerizing the above polyethers. Moreover, the polymer segment having a low melting point includes also polyesters obtained from an aliphatic or alicyclic dicarboxylic acid having 2 to 12 carbon atoms and an aliphatic or alicyclic glycol having 2 to 10 carbon atoms, for example, aliphatic polyesters such as polyethylene adipate, polytetramethylene adipate, polyethylene sebacate, polyneopentyl sebacate, polytetramethylene dodecanate, polytetramethylene azelate, polyhexamethylene azelate, poly-$\epsilon$-caprolactone, etc.; and aliphatic copolyesters obtained from two kinds of the above-mentioned aliphatic dicarboxylic acids and two kinds of the above-mentioned glycols. The polymer segment having a low melting point includes further polyester polyether block copolymers obtained by a combination of the above-mentioned aliphatic polyesters and aliphatic polyethers.

In preferred thermoplastic polyester block copolymers used in the present invention, the polyester segment having a high melting point consists of a polyester obtained from an aromatic dicarboxylic acid and a glycol having a low molecular weight and the polymer segment having a low melting point consists of a polyalkylene glycol or a polylactone. In the preferred polyester block copolymers, the aromatic dicarboxylic acid composing the polyester segment having a high melting point consists, more preferably, of 65 to 100% by mole of terephthalic acid and 35 to 0% by mole of isophthalic acid, and the low molecular weight glycol component consists, more preferably, of 65 to 100 % by mole of 1,4-butanediol and 35 to 0 % by mole of other glycol having a molecular weight of not more than 300. The polyalkylene glycol composing the polymer segment having a low melting point consists, more preferably, of at least 70 % by mole of polytetramethylene glycol, and the lactone consists, more preferably, of at least 70 % by mole of ε-caprolactone.

The polyester block copolymers can be prepared by a conventional polycondensation reaction, preferably by subjecting an aromatic dicarboxylic acid or a dialkyl ester thereof, a compound forming the low melting point segment (e.g. a polyalkylene glycol) and a low molecular weight glycol to esterification or ester exchange reaction by heating at a temperature of about 150° to 26° C. in the presence of a catalyst and then subjecting to a polycondensation reaction while removing excess low molecular weight diol under vacuum; or by previously preparing a prepolymer for forming the polyester segment having a high melting point and a prepolymer for forming the polymer segment having a low melting point, mixing the previously prepared prepolymers with a bifunctional chain extender which is reactive with the terminal group of the prepolymers, reacting them, and then removing the volatile components contained therein under high vacuum; or by mixing with heating a polyester having a high melting point and having a high degree of polymerization with a lactone, and subjecting them to ester exchange reaction while proceeding ring opening polymerization of the lactone.

The liquid MDI used in the present invention means a liquified MDI which is prepared by partial carbodiimidation of pure MDI (said pure MDI being solid at room temperature and having a melting point of 38° C.). The carbodiimide forms usually a cycloadduct with other MDI at room temperature, as is shown in Scheme-I:

Scheme-I

OCN—R—NCO ⟶ [OCN—R—N=C=N—R—NCO]

-continued
Scheme-I
(A: MDI) (Carbodiimide)

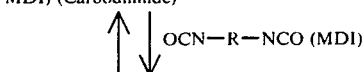

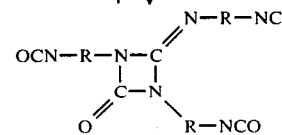

(B: Cycloadduct)

wherein R is 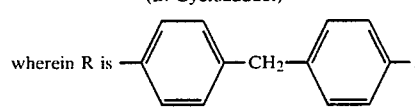

Accordingly, the liquid MDI is a mixture of pure MDI (formula A) and the cycloadduct (formula B). The liquid MDI is prepared by heating a conventional MDI (which is solid at room temperature) in an inert gas or under high vacuum (e.g. less than 1 mmHg), by which one molecule of carbon dioxide is removed from two molecules of MDI and thereby the MDI is carbodiimidated. Said carbodiimide thus produced reacts almost with another molecule of MDI at a temperature of lower than 65° C. and thereby is converted into a cycloadduct which is a pale yellow, transparent liquid. In the liquid MDI, the ratio of the cycloadduct and the pure MDI may be optionally varied in any ratio. Thus, the liquid MDI used in the present invention is clearly different from a mere mixture of a conventional pure MDI with a conventional polycarbodiimide (e.g. STABAXOL-P, manufactured by Mobay Chemical Co.)

In the liquid MDI used in the present invention, the cycloadduct (B) and pure MDI (A) are in equilibrium as is shown in the above Scheme-1, and the ratio thereof is in the range of cycloadduct/pure MDI=0.005 mole/1 mole to 0.5 mole/1 mole. The preferred molar ratio of cycloadduct is 0.02 to 0.2. When the molar ratio of cycloadduct is less than 0.005, the mixture of the cycloadduct and pure MDI becomes solid at room temperature, and on the other hand, when the molar ratio of cycloadduct is over 0.5, the liquid MDI is hardly reactive with a polyester block copolymer and hence the reaction takes much longer time until completion, and thereby, the modification of the polyester block copolymer is less effective. Such a suitable liquid MDI is commercially available, for instance, Isonate 143 L (manufactured by Kasei Upjon K.K., Japan, molar ratio of cycloadduct/pure MDI=about 0.13).

The thermoplatic elastomer composition of the present invention is prepared by mixing 100 parts by weight of the polyester block copolymer as mentioned hereinbefore and 0.05 to 20 parts by weight of the liquid MDI as mentioned above. When the liquid MDI is used in an amount of less than 0.05 part by weight per 100 parts by weight of the copolymer, the composition shows little increase of melt viscosity thereof before the mixing, and on the other hand, when the amount of liquid MDI is over 20 parts by weight, the composition shows too increased melt viscosity and becomes insoluble in a solvent for measuring solution viscosity (e.g. phenol/tetrachloroethane), and such a composition can not give a sheet having a uniform thickness by extrusion molding. The melt viscosity is proportional to the solution viscosity.

The thermoplastic elastomer composition is conveniently produced by kneading a polyester block copolymer and a liquid MDI with a single or twin screw extruder at a temperature of 180° to 250° C. to extrude in a shape of, for example, strands, cooling the extruded product with water and then forming it into the form of chips. In order to promote the reaction during the kneading, the kneading may be carried out in the presence of a catalyst such as a tertiary amine (e.g. triethylamine) or an organic tin compound (e.g. dibutyl tin laurate). Besides, depending on the conditions in the kneading, the chips obtained may be aged, for example, by heating in order to complete the reaction.

The composition of the present invention has various excellent properties. The composition may be incorporated with some stabilizers, such as a stabilizer for ultraviolet, a stabilizer for heat oxidation and a stabilizer for hydrolysis. Suitable examples of the stabilizer are stabilizers for ultraviolet such as substituted benzophenones (e.g. 2-hydroxy-4-methoxybenzophenone) and substituted benzotriazoles (e.g. 2-(2'-hydroxy-5'-methylphenyl)benzotriazole); stabilizers for heat oxidation such as phenol derivatives (e.g. tetrakis[methylene-3-(3,5-di-tert-butyl-4'-hydroxyphenyl)propionate]methane, 1,3,5-trimethyl-2,4,6-tris[3,5-di-tertbutyl-4-hydroxybenzyl]benzene, 4,'-thiobis(3-methyl-6-tert-butylphenol), 4,4'-butylidenebis(6-tert-butyl-m-cresol, etc.), aromatic amines (e.g. N,N'-bis($\beta$-naphthyl)paraphenylenediamine, N,N'-bis(1-methylheptyl)-paraphenylenediamine, etc.), thiodipropionates (e.g. dilauryl dithiopropionate, distearyl dithiopropionate, etc.), or a mixture of two or more thereof; and stabilizers for hydrolysis such as carbodiimides (e.g. STABAXOL-P, manufactured by Mobay Chemical Co.). These stabilizers may be added to the mixture together with the liquid MDI or at any stage of the production of composition.

The reaction product of a thermoplatic polyester copolymer and a liquid MDI which is made in the form of chips in the extruder has less variation of melt viscosity in production lot in comparison with the products produced by using a conventional solid MDI. Moreover, by using the liquid polyisocyanate containing carbodiimide bond, the resulting product contains polycarbodiimide in the main chain, and hence, shows improved hydrolysis resistance. Besides, when a polycarbodiimide is incorporated into the polyester elastomer as an agent for preventing hydrolysis, it can be formed into the desired shaped articles without occurrence of any bad smell. When a composition obtained by meltmixing at a comparatively lower temperature (e.g. at about 200° C.), forming into chips and heat treating at a temperature of 40° to 100° C. for 1 to 4 hours, the remaining isocyanate group is completely reacted without occurrence of any side reaction. After the heat treatment, the composition may immediately be subjected to the subsequent drying step at 100° C.

The present invention is illustrated by the following Preparations, Examples and Reference Examples, but should not be construed to be limited thereto. In the Preparations, Examples and Reference Examples, "part" and "%" mean "part by weight" and "% by weight", respectively, unless specified otherwise.

The properties of the products in Preparations, Examples and Reference Examples are measured by the following methods.

Surface hardness, tensile strength, tensile elongation, and flexural fatigue resistance are measured by the method as defined in Japan Industrial Standards (JIS) K 6301.

Solution viscosity is measured in a concentration of the test sample of 2g/liter in phenol/tetrachloroethane (6/4) at 30° C.

Boiling water resistance is measured by dipping the test sample in a boiling water at 100° C. for 10 days and thereafter measuring the tensile strength and tensile elongation thereof.

PREPARATION 1

A solid MDI (Isonate 125 M, manufactured by Kasei Upjohn K.K.) is heat treated at 150° C. under high vacuum (0.5 mmHg) to give liquid MDI (a) to (d) which have various ratios of cycloadduct/pure MDI. These liquid MDI have the following molar ratio of cycloadduct/pure MDI which is measured by isocyanate equivalent in the liquid MDI.

| Liquid MDI | Cycloadduct/pure MDI |
|---|---|
| (a) | 0.13 |
| (b) | 0.18 |
| (c) | 0.004 |
| (d) | 0.56 |

PREPARATION 2

Dimethyl terephthalate, 1,4-butanediol and polyoxytetramethylene glycol (number average molecular weight: about 1,000) (abbreviated as "PTMG") are polymerized to give polyester polyether block copolymers having PTMG units of 25 % and 50 %, respectively (Polymer A and Polymer B). Solution viscosity (nsp/c) is 1.45 in Polymer A and 1.71 in Polymer B.

EXAMPLE 1

To each of Polymer A and Polymer B (each 100 kg) is added liquid MDI (a) (5.0 kg), and the mixture is meltmixed and melt-extruded with a single screw extruder. The extruded mixture is solidified in the form of strand in water bath and then cut into chips. The chips thus obtained are aged with a hot air dryer at 80° C. for one hour and then dried at 110° C. for one hour to give Compositions I and II.

REFERENCE EXAMPLE 1

Example 1 is repeated except that a solid MDI is used instead of the liquid MDI to give Compositions III and IV.

Various properties of Compositions I to IV, i.e. general properties, variation of solution viscosity of composition in production lots (maximum and minimum among 5 points measurement), flexural fatigue resistance, boiling water resistance, etc. were measured. The results are shown in Table 1. As is clear from the results, Compositions I and II showed excellent water resistance and extremely small variation of solution viscosity of composition in the production lots.

TABLE 1

| Components and properties | I | II | III | IV |
|---|---|---|---|---|
| Polymer A (kg) | 100 | 0 | 100 | 0 |
| Polymer B (kg) | 0 | 100 | 0 | 100 |
| Surface hardness (JIS A) | 98 | 89 | 98 | 89 |
| Tensile strength (kg/cm$^2$) | 450 | 300 | 380 | 210 |

TABLE 1-continued

| Components and properties | I | II | III | IV |
|---|---|---|---|---|
| Tensile elongation (%) | 500 | 660 | 460 | 600 |
| Solution viscosity ($\eta sp/c$) | | | | |
| Maximum | 2.31 | 2.76 | 2.60 | 2.99 |
| Minimum | 2.28 | 2.72 | 1.83 | 2.24 |
| Flexural fatigue resistance (times until growth of cracking in 10 mm length) | $2 \times 10^5$ | $1 \times 10^6$ | $1 \times 10^4$ | $5 \times 10^4$ |
| Boiling water resistance | | | | |
| Retention of tensile strength (%) | 89 | 78 | 65 | 40 |
| Retention of tensile elongation (%) | 102 | 98 | 80 | 53 |

[Note]:
Retention of tensile strength and tensile elongation means the percentage of the value of the tensile strength and tensile elongation after subjected to the boiling water resistant test to those before the test.

Besides, Compositions II and IV were each extruded with a sheet extruder (i.e. a single screw extruder having a hanger slit die at the tip thereof) to form a sheet. Occurrence of fish eye per 100 cm² on the sheet thus prepared was counted, and further the solution viscosity ($\eta sp/c$) at said fish eye region and also at smooth surface region was also measured. The results are shown in Table 2.

TABLE 2

| Properties | II | IV |
|---|---|---|
| Fish eyes (number) | 0 | 14 |
| $\eta sp/c$ at fish eye region | — | 3.23 |
| $\eta sp/c$ at smooth surface region | 2.75 | 2.66 |

As is clear from the above results, Composition IV showed occurrence of fish eye and partial increase of viscosity due to variation in the production lots during forming step.

EXAMPLE 2

Example 1 is repeated except that liquid MDI (b) is used instead of liquid MDI (a) to give Composition V. As to the Composition V, the general properties, variation of solution viscosity in the production lots, flexural fatigue resistance and boiling water resistance were measured. The results are shown in Table 4.

PREPARATION 3

In the same manner as described in Preparation 2, there are prepared various polyester polyether block copolymers (Polymer C, D and E). The components of these polymers are shown in Table 3.

TABLE 3

| Components and properties | Polymer C | Polymer D | Polymer E |
|---|---|---|---|
| Tetramethylene terephthalate unit (% by weight) | 25 | 55 | 20 |
| Tetramethylene isophthalate unit (% by weight) | 0 | 20 | 0 |
| Polyoxytetramethylene glycol unit (% by weight) | 75 | 25 | 80 |
| Molecular weight of PTMG | 1,000 | 1,000 | 2,000 |
| Solution viscosity of polymer ($\eta sp/c$) | 2.03 | 1.61 | 2.35 |

EXAMPLE 3

To each of these Polymers C, D and E (each 100 kg) is added liquid MDI (a) (5.0 kg), and the mixture is treated in the same manner as described in Example 1 to give Compositions VI to VIII.

As to these Compositions VI to VIII, the general properties, variation of solution viscosity in the production lots, flexural fatigue resistance, and boiling water resistance were measured. The results are shown in Table 4.

PREPARATION 4

To polybutylene terephthalate (solution viscosity: 1.02) (100 parts) is added ε-caprolactone (50 parts), and the mixture is heated at 25° C. to give an aromatic polyester —aliphatic polyester block copolymer (solution viscosity: 1.23) (Polymer F).

EXAMPLE 4

To Polymer F (100 kg) is added liquid MDI (a) (5.0 kg), and the mixture is treated in the same manner as described in Example 1 to give Composition IX.

As to the Composition IX, the general properties, variation of solution viscosity of composition in the production lots, flexural fatigue resistance, and boiling water resistance were measured. The results are shown in Table 4.

TABLE 4

| Example No. | 2 | 3 | 3 | 3 | 4 |
|---|---|---|---|---|---|
| Composition | V | VI | VII | VIII | IX |
| Polymer | A | C | D | E | F |
| Liquid MDI | b | a | a | a | a |
| Properties: | | | | | |
| Surface hardness (JIS A) | 98 | 78 | 96 | 74 | 96 |
| Tensile strength (kg/cm²) | 470 | 240 | 440 | 210 | 420 |
| Tensile elongation (%) | 490 | 710 | 420 | 780 | 490 |
| Solution viscosity ($\eta sp/c$) | | | | | |
| Maximum | 2.34 | 2.95 | 2.66 | 3.26 | 1.94 |
| Minimum | 2.33 | 2.91 | 2.64 | 3.22 | 1.89 |
| Flexural fatigue resistance (times until growth of cracking in 10 mm length) | $2 \times 10^5$ | $4 \times 10^6$ | $8 \times 10^5$ | $9 \times 10^6$ | $1 \times 10^5$ |
| Boiling water resistance | | | | | |
| Retention of tensile strength (%) | 89 | 75 | 84 | 73 | 69 |
| Retention of tensile elongation (%) | 104 | 98 | 100 | 95 | 88 |

REFERENCE EXAMPLE 2

Example 1 is repeated except that liquid MDI (c) and (d) are used instead of liquid MDI (a) to prepare Compositions X and XI.

REFERENCE EXAMPLE 3

In the same manner as described in Examples 3 and 4 except that a solid MDI is used instead of liquid MDI, Polymers C, D, E and F are each mixed with the solid MDI to prepare Compositions XII to XV.

REFERENCE EXAMPLE 4

In the same manner as described in Example 1 except that a liquid 2,4-tolylenediisocyanate (TDI) (melting point: 19.5°–21.5° C.) or a dimer of isophorone diisocyanate (IPDI) (which is solid at room temperature) is used instead of liquid MDI, there are prepared Compositions XVI and XVII.

As to the Compositions X to XVII prepared in Reference Examples 2 to 4, the general properties, variation of solution viscosity in the production lots, flexural fatigue resistance, and boiling water resistance were measured. The results are shown in Table 5.

TABLE 5

| Reference Example No. | 2 | 2 | 3 | 3 | 3 | 3 | 4 | 4 |
|---|---|---|---|---|---|---|---|---|
| Composition | X | XI | XII | XIII | XIV | XV | XVI | XVII |
| Polymer | A | A | C | D | E | F | A | A |
| Poly-isocynate | Liquid MDI (c) | Liquid MDI (d) | Solid MDI | Solid MDI | Solid MDI | Solid MDI | Liquid TDI | Solid IPDI |
| Properties: | | | | | | | | |
| Surface hardness (JIS A) | 98 | 98 | 78 | 96 | 74 | 96 | 98 | 98 |
| Tensile strength (kg/cm$^2$) | 380 | 320 | 200 | 350 | 170 | 340 | 370 | 360 |
| Tensile elongation (%) | 460 | 430 | 640 | 390 | 700 | 440 | 440 | 410 |
| Solution viscosity ($\eta$sp/c) | | | | | | | | |
| Maximum | 1.52 | 2.20 | 3.36 | 2.84 | 3.64 | 2.16 | 2.66 | 2.53 |
| Minimum | 1.45 | 1.96 | 2.72 | 2.37 | 2.89 | 1.71 | 1.83 | 1.79 |
| Flexural fatigue resistance (times until growth of cracking in 10 mm length) | $1 \times 10^4$ | $8 \times 10^3$ | $3 \times 10^5$ | $4 \times 10^4$ | $8 \times 10^5$ | $7 \times 10^3$ | $2 \times 10^4$ | $1 \times 10^4$ |
| Boiling water resistance | | | | | | | | |
| Retention of tensile strength (%) | 65 | 60 | 38 | 62 | 38 | 30 | 68 | 66 |
| Retention of tensile elongation (%) | 80 | 77 | 50 | 79 | 50 | 44 | 77 | 75 |

As is clear from the above Examples and Reference Examples, the thermoplatic elastomer composition of the present invention which is incorporated with the specific liquid MDI shows less variation of solution viscosity of composition in the production lots and excellent flexural fatigue resistance and boiling water resistance without occurrence of fish eye and partial increase of viscosity due to variation in the production lots during the forming step, while the product obtained by using a solid diisocyanate shows large variation of solution viscosity of composition in the production lots, less flexural fatigue resistance and less boiling water resistance, and further shows occurrence of fish eye during the forming step.

What is claimed is:

1. A thermoplastic elastomer composition, which comprises:
100 parts by weight of a thermoplastic polyester block copolymer comprising a polyester segment having a high melting point and a polymer segment having a low melting point and having a molecular weight of 400 to 6,000 wherein a polymer produced from the polyester segment having a high melting point alone has a melting point of not lower than 150° C. and the polymer segment having a low melting point alone has a melting or softening point of not higher than 80° C., and
0.05 to 20 parts by weight of a liquid diphenylmethane diisocyanate comprising a mixture of pure diphenylmethane diisocyanate and a cycloadduct of the formula:

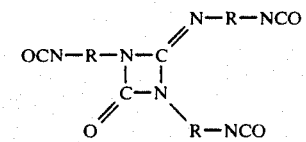

wherein R is 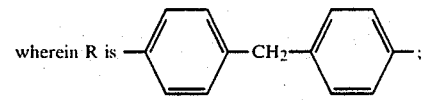

in said mixture of the pure diphenylmethane diisocyanate and the cycloadduct, these being in the molar ratio of the cycloadduct/pure diphenylmethane diisocyanate of 0.02 to 0.5/1.

2. The composition according to claim 1, wherein the molar ratio of the cycloadduct and the pure diphenylmethane diisocyanate is in the range of 0.02/1 to 0.2/1.

3. The composition according to claim 1, wherein the polymer segment having a low melting point is contained in the ratio of 5 to 80 % by weight based on the whole weight of the polyester block copolymer.

4. The composition according to claim 3, wherein the ratio of the polymer segment having a low melting point is in the range of 20 to 80 % by weight.

5. The composition according to claim 4, wherein the polyester segment having a high melting point consists of a polyester obtained from an aromatic dicarboxylic acid and a glycol having a low molecular weight and the polymer segment having a low melting point consists of a polyalkylene glycol or a polylactone.

6. The composition according to claim 5, wherein the aromatic dicarboxylic acid composing the polyester segment having a high melting point consists of 65 to 100 % by mole of terephthalic acid and 35 to 0 % by mole of isophthalic acid, and the low moledular weight glycol component consists of 65 to 100 % by mole of 1,4-butanediol and 35 to 0 % by mole of other glycol having a molecular weight of not more than 300, and the polyalkylene glycol composing the polymer segment having a low melting point consists of at least 70 % by mole of polytetramethylene glycol, and the polylactone consists of at least 70 % by mole of ε-caprolactone.

7. The composition according to claim 1, wherein the molar ratio of the cycloadduct and the pure diphenylmethane diisocyanate ranges from about 0.13/1 to about 0.2/1.

* * * * *